(12) United States Patent
Conwell

(10) Patent No.: US 10,007,723 B2
(45) Date of Patent: *Jun. 26, 2018

(54) METHODS FOR IDENTIFYING AUDIO OR VIDEO CONTENT

(71) Applicant: Digimarc Corporation, Beaverton, OR (US)

(72) Inventor: William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/074,967

(22) Filed: Mar. 18, 2016

(65) Prior Publication Data

US 2016/0246878 A1    Aug. 25, 2016

Related U.S. Application Data

(60) Continuation of application No. 14/519,973, filed on Oct. 21, 2014, now Pat. No. 9,292,513, which is a
(Continued)

(51) Int. Cl.
*H04L 29/06* (2006.01)
*G06F 17/30* (2006.01)
(Continued)

(52) U.S. Cl.
CPC .. *G06F 17/30743* (2013.01); *G06F 17/30017* (2013.01); *G06F 17/30023* (2013.01);
(Continued)

(58) Field of Classification Search
CPC ......... G06F 17/30743; G06F 17/30017; G06F 17/30023; G06F 17/30265;
(Continued)

(56) References Cited

U.S. PATENT DOCUMENTS

| 4,677,466 A | 6/1987 | Lert et al. |
| 5,210,820 A | 5/1993 | Kenyon |

(Continued)

FOREIGN PATENT DOCUMENTS

| JP | 2010187419 A | 8/2010 |
| WO | WO02011033 | 2/2002 |

(Continued)

OTHER PUBLICATIONS

Allamanche et al. "Content-Based Identification of Audio Material Using Mpeg-7 Low Level Description," in Proc. of the Int. Symp. of Music Information Retrieval, Indiana, USA, Oct. 2001.
(Continued)

*Primary Examiner* — Michael S McNally
(74) *Attorney, Agent, or Firm* — Digimarc Corporation

(57) ABSTRACT

The disclosed technology generally relates to methods for identifying audio and video entertainment content. One claim recites network server comprising: an input for receiving data representing audio uploaded to said network server; memory for storing the data representing audio; one or more processors configured for processing the data representing audio to yield fingerprint data; memory for storing fingerprint data; one or more processors configured for: determining whether the fingerprint data incurs a potential match with the stored fingerprint data, the potential match indicating an unreliability in the match below a predetermined threshold; and issuing a call, upon a condition of unreliability in the match, requesting at least a first reviewer and a second reviewer to review the data representing audio; an interface for receiving results from the first reviewer and results from the second reviewer; and one or more processors configured for weighting results from the first reviewer differently than results from the second reviewer, and determining whether to allow public access to the data represent-
(Continued)

ing audio based at least in part on weighted results. Of course other combinations and claims are provided.

23 Claims, 3 Drawing Sheets

Related U.S. Application Data continuation of application No. 13/909,834, filed on Jun. 4, 2013, now Pat. No. 8,868,917, which is a continuation of application No. 13/714,930, filed on Dec. 14, 2012, now Pat. No. 8,458,482, which is a continuation of application No. 12/114,612, filed on May 2, 2008, now Pat. No. 8,341,412, which is a division of application No. 11/613,891, filed on Dec. 20, 2006, now abandoned.

(60) Provisional application No. 60/753,652, filed on Dec. 23, 2005.

(51) Int. Cl.
| | | |
|---|---|---|
| *G06Q 10/00* | (2012.01) | |
| *G06Q 50/18* | (2012.01) | |
| *G06Q 50/26* | (2012.01) | |
| *H04L 9/32* | (2006.01) | |
| *G06K 9/62* | (2006.01) | |
| *G06N 5/04* | (2006.01) | |
| *G06Q 50/00* | (2012.01) | |

(52) U.S. Cl.
CPC .. *G06F 17/30265* (2013.01); *G06F 17/30784* (2013.01); *G06K 9/62* (2013.01); *G06N 5/048* (2013.01); *G06Q 10/00* (2013.01); *G06Q 50/18* (2013.01); *G06Q 50/265* (2013.01); *H04L 9/3247* (2013.01); *H04L 63/08* (2013.01); *G06Q 50/01* (2013.01)

(58) Field of Classification Search
CPC .... G06F 17/30784; G06K 9/62; G06N 5/048; G06N 50/18; G06N 50/265; G06N 50/10; H04L 9/3247; H04L 63/08
USPC ........................................................ 713/176
See application file for complete search history.

(56) References Cited

U.S. PATENT DOCUMENTS

| | | | |
|---|---|---|---|
| 5,629,980 A | 5/1997 | Stefik | |
| 5,634,012 A | 5/1997 | Stefik et al. | |
| 5,664,018 A | 9/1997 | Leighton | |
| 5,679,938 A | 10/1997 | Templeton | |
| 5,679,940 A | 10/1997 | Templeton | |
| 5,715,403 A | 2/1998 | Stefik | |
| 5,765,152 A | 6/1998 | Erickson | |
| 5,892,536 A | 4/1999 | Logan et al. | |
| 5,910,987 A | 6/1999 | Ginter | |
| 5,913,205 A | 6/1999 | Jain et al. | |
| 5,918,223 A | 6/1999 | Blum et al. | |
| 5,983,351 A | 11/1999 | Glogau | |
| 5,991,429 A | 11/1999 | Coffin | |
| 6,035,055 A | 3/2000 | Wang et al. | |
| 6,055,538 A | 4/2000 | Kessenich | |
| 6,081,788 A | 6/2000 | Appleman | |
| 6,091,822 A | 7/2000 | Mellows et al. | |
| 6,121,530 A | 9/2000 | Sonoda | |
| 6,122,403 A | 9/2000 | Rhoads | |
| 6,236,971 B1 | 5/2001 | Stefik | |
| 6,251,016 B1 | 6/2001 | Tsuda | |
| 6,292,575 B1 | 9/2001 | Bortolussi et al. | |
| 6,295,439 B1 * | 9/2001 | Bejar | G09B 7/02 434/118 |
| 6,301,370 B1 | 10/2001 | Steffens et al. | |
| 6,401,118 B1 | 6/2002 | Thomas | |
| 6,407,680 B1 | 6/2002 | Lai et al. | |
| 6,430,306 B2 | 8/2002 | Slocum et al. | |
| 6,466,695 B1 | 10/2002 | Potzsch et al. | |
| 6,493,744 B1 | 12/2002 | Emens | |
| 6,505,160 B1 | 1/2003 | Levy et al. | |
| 6,513,018 B1 | 1/2003 | Culhane | |
| 6,546,135 B1 | 4/2003 | Lin | |
| 6,563,950 B1 | 5/2003 | Wiskott et al. | |
| 6,574,609 B1 | 6/2003 | Downs | |
| 6,597,775 B2 | 7/2003 | Lawyer et al. | |
| 6,603,921 B1 | 8/2003 | Kanevsky | |
| 6,647,548 B1 | 11/2003 | Lu | |
| 6,684,254 B1 | 1/2004 | Dutta | |
| 6,693,236 B1 | 2/2004 | Gould et al. | |
| 6,772,196 B1 | 8/2004 | Kirsch et al. | |
| 6,783,459 B2 | 8/2004 | Cumbers | |
| 6,795,638 B1 | 9/2004 | Skelley | |
| 6,807,634 B1 | 10/2004 | Braudaway | |
| 6,810,388 B1 | 10/2004 | Sato | |
| 6,829,368 B2 | 12/2004 | Meyer et al. | |
| 6,834,308 B1 | 12/2004 | Ikezoye | |
| 6,871,200 B2 | 3/2005 | MacQueen et al. | |
| 6,889,383 B1 | 5/2005 | Jarman | |
| 6,898,799 B1 | 5/2005 | Jarman | |
| 6,944,604 B1 | 9/2005 | Majoor | |
| 6,947,571 B1 | 9/2005 | Rhoads | |
| 6,948,657 B2 | 9/2005 | Sugino | |
| 6,952,769 B1 | 10/2005 | Dubey | |
| 6,965,889 B2 | 11/2005 | Serrano-Morales et al. | |
| 6,968,328 B1 | 11/2005 | Kintzer et al. | |
| 6,976,165 B1 | 12/2005 | Carpentier et al. | |
| 6,983,371 B1 | 1/2006 | Hurtado et al. | |
| 6,990,453 B2 * | 1/2006 | Wang | G06F 17/30743 704/270 |
| 7,003,131 B2 | 2/2006 | Watson et al. | |
| 7,020,635 B2 | 3/2006 | Hamilton et al. | |
| 7,043,473 B1 | 5/2006 | Rassool et al. | |
| 7,047,241 B1 | 5/2006 | Erickson | |
| 7,085,741 B2 | 8/2006 | Lao et al. | |
| 7,113,615 B2 | 9/2006 | Rhoads | |
| 7,117,513 B2 | 10/2006 | Nelson | |
| 7,120,273 B2 | 10/2006 | Robins | |
| 7,159,116 B2 | 1/2007 | Moskowitz | |
| 7,185,201 B2 | 2/2007 | Rhoads | |
| 7,194,490 B2 | 3/2007 | Zee | |
| 7,197,459 B1 * | 3/2007 | Harinarayan | G06Q 10/063112 704/270 |
| 7,266,704 B2 | 9/2007 | Levy | |
| 7,277,891 B2 | 10/2007 | Howard | |
| 7,284,255 B1 | 10/2007 | Apel | |
| 7,298,864 B2 | 11/2007 | Jones | |
| 7,302,574 B2 | 11/2007 | Conwell | |
| 7,308,413 B1 | 12/2007 | Tota | |
| 7,314,162 B2 | 1/2008 | Carr et al. | |
| 7,346,472 B1 | 3/2008 | Moskowitz et al. | |
| 7,346,605 B1 | 3/2008 | Hepworth | |
| 7,363,278 B2 | 4/2008 | Schmelzer | |
| 7,366,787 B2 | 4/2008 | Salas et al. | |
| 7,369,677 B2 | 5/2008 | Petrovic et al. | |
| 7,370,017 B1 | 5/2008 | Lindeman et al. | |
| 7,379,214 B2 | 5/2008 | Matsumoto | |
| 7,421,723 B2 | 9/2008 | Harkness | |
| 7,444,403 B1 | 10/2008 | Packer | |
| 7,529,659 B2 | 5/2009 | Wold | |
| 7,562,012 B1 | 7/2009 | Wold et al. | |
| 7,653,552 B2 | 1/2010 | Vaidyanathan et al. | |
| 7,681,032 B2 | 3/2010 | Peled et al. | |
| 7,689,532 B1 | 3/2010 | Levy | |
| 7,702,591 B2 | 4/2010 | Nuttall | |
| 7,703,140 B2 | 4/2010 | Nath | |
| 7,707,427 B1 | 4/2010 | Kenrich et al. | |
| 7,711,731 B2 | 5/2010 | Amir et al. | |
| 7,730,316 B1 | 6/2010 | Baccash | |
| 7,757,075 B2 | 7/2010 | Detreville | |
| 7,783,489 B2 | 8/2010 | Kenyon et al. | |
| 7,831,531 B1 | 11/2010 | Baluja et al. | |
| 7,870,574 B2 | 1/2011 | Kenyon | |

(56) References Cited

U.S. PATENT DOCUMENTS

| | | |
|---|---|---|
| 7,877,438 B2 | 1/2011 | Schrempp et al. |
| 7,881,957 B1 | 2/2011 | Cohen et al. |
| 7,899,694 B1* | 3/2011 | Marshall .............. G06Q 10/063 |
| | | 705/300 |
| 7,945,470 B1 | 5/2011 | Cohen et al. |
| 8,010,511 B2 | 8/2011 | Brock et al. |
| 8,090,717 B1 | 1/2012 | Bharat et al. |
| 8,185,967 B2 | 5/2012 | Levy |
| 8,341,412 B2 | 12/2012 | Conwell |
| 8,458,482 B2 | 6/2013 | Conwell |
| 8,490,206 B1 | 7/2013 | Fish |
| 8,688,999 B2 | 4/2014 | Conwell |
| 8,707,459 B2 | 4/2014 | Brock et al. |
| 8,738,749 B2 | 5/2014 | Brock et al. |
| 8,868,917 B2 | 10/2014 | Conwell |
| 9,179,200 B2 | 11/2015 | Davis |
| 9,785,841 B2 | 10/2017 | Davis |
| 2001/0010756 A1 | 8/2001 | Ogino |
| 2001/0025341 A1 | 9/2001 | Marshall |
| 2002/0002586 A1 | 1/2002 | Rafal |
| 2002/0028000 A1 | 3/2002 | Conwell |
| 2002/0031253 A1 | 3/2002 | Dialameh et al. |
| 2002/0038296 A1 | 3/2002 | Margolus et al. |
| 2002/0152215 A1 | 3/2002 | Clark et al. |
| 2002/0048369 A1 | 4/2002 | Ginter et al. |
| 2002/0052849 A1 | 5/2002 | McCutchen |
| 2002/0052885 A1 | 5/2002 | Levy |
| 2002/0069370 A1 | 6/2002 | Mack |
| 2002/0077986 A1 | 6/2002 | Kobata |
| 2002/0078441 A1 | 6/2002 | Drake |
| 2002/0082731 A1 | 6/2002 | Pitman et al. |
| 2002/0082999 A1 | 6/2002 | Lee et al. |
| 2002/0083079 A1 | 6/2002 | Meier |
| 2002/0087885 A1 | 7/2002 | Peled et al. |
| 2002/0120925 A1 | 8/2002 | Logan |
| 2002/0132663 A1 | 9/2002 | Cumbers |
| 2002/0141578 A1 | 10/2002 | Ripley |
| 2002/0165819 A1 | 11/2002 | McKnight et al. |
| 2002/0168082 A1 | 11/2002 | Razdan |
| 2002/0174132 A1 | 11/2002 | Silverman |
| 2002/0178271 A1 | 11/2002 | Graham et al. |
| 2002/0178410 A1 | 11/2002 | Haitsma et al. |
| 2003/0002709 A1 | 1/2003 | Wu |
| 2003/0018709 A1 | 1/2003 | Schrempp |
| 2003/0021441 A1* | 1/2003 | Levy ..................... G10L 19/018 |
| | | 382/100 |
| 2003/0033321 A1 | 2/2003 | Schrempp |
| 2003/0037010 A1 | 2/2003 | Schmelzer |
| 2003/0052768 A1 | 3/2003 | Maune |
| 2003/0061490 A1 | 3/2003 | Abajian |
| 2003/0086341 A1* | 5/2003 | Wells ................ G06F 17/30017 |
| | | 369/13.56 |
| 2003/0093790 A1 | 5/2003 | Logan et al. |
| 2003/0099379 A1 | 5/2003 | Monk et al. |
| 2003/0101104 A1 | 5/2003 | Dimitrova et al. |
| 2003/0115459 A1 | 6/2003 | Monk |
| 2003/0135623 A1 | 7/2003 | Schrempp |
| 2003/0216988 A1 | 11/2003 | Mottett et al. |
| 2003/0231785 A1 | 12/2003 | Rhoads et al. |
| 2004/0009763 A1 | 1/2004 | Stone |
| 2004/0010417 A1 | 1/2004 | Peled |
| 2004/0010602 A1 | 1/2004 | Van Vleck et al. |
| 2004/0019807 A1 | 1/2004 | Freund |
| 2004/0022444 A1 | 2/2004 | Rhoads |
| 2004/0044571 A1 | 3/2004 | Bronnimann |
| 2004/0054661 A1 | 3/2004 | Cheung |
| 2004/0059953 A1 | 3/2004 | Purnell |
| 2004/0064415 A1 | 4/2004 | Abdallah et al. |
| 2004/0071314 A1 | 4/2004 | Yacobi |
| 2004/0078292 A1 | 4/2004 | Blumenau |
| 2004/0107166 A1 | 6/2004 | Stefik et al. |
| 2004/0107348 A1 | 6/2004 | Iwamura |
| 2004/0133582 A1 | 7/2004 | Howard |
| 2004/0153663 A1 | 8/2004 | Clark et al. |
| 2004/0163106 A1 | 8/2004 | Schrempp et al. |
| 2004/0189441 A1 | 9/2004 | Stergiou |
| 2004/0205030 A1 | 10/2004 | Fox |
| 2004/0213437 A1* | 10/2004 | Howard ............ G06F 17/30011 |
| | | 382/115 |
| 2004/0221118 A1 | 11/2004 | Slater et al. |
| 2004/0225645 A1 | 11/2004 | Rowney |
| 2004/0230527 A1 | 11/2004 | Hansen et al. |
| 2004/0230529 A1 | 11/2004 | Tieu et al. |
| 2004/0236828 A1 | 11/2004 | Igeta |
| 2004/0243567 A1 | 12/2004 | Levy |
| 2004/0245330 A1 | 12/2004 | Swift et al. |
| 2004/0255147 A1 | 12/2004 | Peled et al. |
| 2004/0267552 A1 | 12/2004 | Gilliam et al. |
| 2005/0008225 A1 | 1/2005 | Yanagisawa et al. |
| 2005/0012563 A1 | 1/2005 | Kramer |
| 2005/0025335 A1 | 2/2005 | Bloom et al. |
| 2005/0039057 A1 | 2/2005 | Bagga et al. |
| 2005/0043548 A1 | 2/2005 | Cates |
| 2005/0043960 A1 | 2/2005 | Blankley |
| 2005/0049868 A1 | 3/2005 | Busayapongchai |
| 2005/0063566 A1 | 3/2005 | Beek |
| 2005/0080846 A1 | 4/2005 | McCleskey et al. |
| 2005/0102515 A1 | 5/2005 | Jaworski et al. |
| 2005/0105726 A1 | 5/2005 | Neubauer et al. |
| 2005/0125358 A1 | 6/2005 | Levin |
| 2005/0132235 A1 | 6/2005 | Teunen |
| 2005/0141707 A1* | 6/2005 | Haitsma .............. G06F 17/3002 |
| | | 380/201 |
| 2005/0154678 A1 | 7/2005 | Schmelzer |
| 2005/0154924 A1 | 7/2005 | Scheidt et al. |
| 2005/0171851 A1 | 8/2005 | Applebaum et al. |
| 2005/0193016 A1 | 9/2005 | Seet et al. |
| 2005/0193408 A1 | 9/2005 | Sull et al. |
| 2005/0213790 A1 | 9/2005 | Rhoads |
| 2005/0216417 A1 | 9/2005 | Risan |
| 2005/0222900 A1 | 10/2005 | Fuloria et al. |
| 2005/0246752 A1 | 11/2005 | Liwerant et al. |
| 2005/0259819 A1 | 11/2005 | Oomen et al. |
| 2005/0273612 A1 | 12/2005 | Van Der Veen et al. |
| 2005/0273617 A1 | 12/2005 | Mihcak et al. |
| 2005/0276570 A1 | 12/2005 | Reed |
| 2005/0278787 A1 | 12/2005 | Naslund |
| 2005/0280502 A1 | 12/2005 | Bell |
| 2005/0288952 A1 | 12/2005 | Davis |
| 2006/0029251 A1 | 2/2006 | Maeda |
| 2006/0031114 A1 | 2/2006 | Zommers |
| 2006/0031870 A1 | 2/2006 | Jarman et al. |
| 2006/0034177 A1 | 2/2006 | Schrempp |
| 2006/0041828 A1 | 2/2006 | King |
| 2006/0041943 A1 | 2/2006 | Singer |
| 2006/0050993 A1 | 3/2006 | Stentiford |
| 2006/0058019 A1 | 3/2006 | Chan |
| 2006/0059116 A1 | 3/2006 | Levi |
| 2006/0059561 A1 | 3/2006 | Ronning et al. |
| 2006/0061599 A1 | 3/2006 | Yu |
| 2006/0075237 A1 | 4/2006 | Seo |
| 2006/0080200 A1 | 4/2006 | Ashton |
| 2006/0080356 A1* | 4/2006 | Burges .............. G06F 17/30017 |
| 2006/0080703 A1 | 4/2006 | Compton |
| 2006/0085816 A1 | 4/2006 | Funk et al. |
| 2006/0086341 A1 | 4/2006 | Burges et al. |
| 2006/0095586 A1 | 5/2006 | Adelman |
| 2006/0101069 A1 | 5/2006 | Bell |
| 2006/0106675 A1* | 5/2006 | Cohen ................... G06Q 10/06 |
| | | 705/26.1 |
| 2006/0106725 A1 | 5/2006 | Finley et al. |
| 2006/0106774 A1* | 5/2006 | Cohen ................... G06Q 30/06 |
| 2006/0110137 A1 | 5/2006 | Tsuda et al. |
| 2006/0112015 A1 | 5/2006 | Chancellor et al. |
| 2006/0115108 A1 | 6/2006 | Rodriguez |
| 2006/0128470 A1 | 6/2006 | Willis |
| 2006/0159128 A1 | 7/2006 | Chen |
| 2006/0171474 A1 | 8/2006 | Ramaswamy |
| 2006/0174348 A1 | 8/2006 | Rhoads |
| 2006/0177198 A1 | 8/2006 | Jarman et al. |
| 2006/0191017 A1 | 8/2006 | Hieda |
| 2006/0212704 A1 | 9/2006 | Kirovski |
| 2006/0212927 A1 | 9/2006 | Riku et al. |
| 2006/0218126 A1 | 9/2006 | De Ruijter |

(56) References Cited

U.S. PATENT DOCUMENTS

| | | |
|---|---|---|
| 2006/0218651 A1 | 9/2006 | Ginter |
| 2006/0230358 A1 | 10/2006 | Sacher et al. |
| 2006/0240862 A1 | 10/2006 | Neven |
| 2006/0271512 A1 | 11/2006 | Burges |
| 2006/0272028 A1 | 11/2006 | Maes |
| 2006/0277564 A1 | 12/2006 | Jarman |
| 2006/0287916 A1 | 12/2006 | Starr |
| 2006/0287996 A1 | 12/2006 | Kender et al. |
| 2007/0005417 A1 | 1/2007 | Desikan |
| 2007/0005979 A1 | 1/2007 | Ishii |
| 2007/0028308 A1 | 2/2007 | Nishio et al. |
| 2007/0033419 A1 | 2/2007 | Kocher |
| 2007/0038567 A1 | 2/2007 | Allaire et al. |
| 2007/0053306 A1 | 3/2007 | Stevens |
| 2007/0055500 A1 | 3/2007 | Bilobrov |
| 2007/0058925 A1 | 3/2007 | Chiu |
| 2007/0061393 A1 | 3/2007 | Moore |
| 2007/0083883 A1 | 4/2007 | Deng |
| 2007/0094145 A1 | 4/2007 | Ta et al. |
| 2007/0098172 A1 | 5/2007 | Levy et al. |
| 2007/0101360 A1 | 5/2007 | Gutta et al. |
| 2007/0106551 A1 | 5/2007 | McGucken |
| 2007/0110010 A1 | 5/2007 | Kotola et al. |
| 2007/0118737 A1 | 5/2007 | Shimizu |
| 2007/0124756 A1 | 5/2007 | Covell et al. |
| 2007/0130015 A1 | 6/2007 | Starr et al. |
| 2007/0130117 A1 | 6/2007 | Lapstun |
| 2007/0130126 A1 | 6/2007 | Lucosysky |
| 2007/0130177 A1 | 6/2007 | Schneider |
| 2007/0130580 A1 | 6/2007 | Covell et al. |
| 2007/0156594 A1 | 7/2007 | McGucken |
| 2007/0157228 A1 | 7/2007 | Bayer |
| 2007/0157252 A1 | 7/2007 | Perez |
| 2007/0162349 A1 | 7/2007 | Silver |
| 2007/0162761 A1 | 7/2007 | Davis |
| 2007/0168543 A1 | 7/2007 | Krikorian et al. |
| 2007/0175998 A1 | 8/2007 | Lev |
| 2007/0180537 A1 | 8/2007 | He et al. |
| 2007/0192352 A1 | 8/2007 | Levy |
| 2007/0198426 A1 | 8/2007 | Yates |
| 2007/0203891 A1 | 8/2007 | Solaro |
| 2007/0203911 A1 | 8/2007 | Chiu |
| 2007/0208711 A1 | 9/2007 | Rhoads |
| 2007/0208715 A1 | 9/2007 | Muehlbauer |
| 2007/0208751 A1 | 9/2007 | Cowan et al. |
| 2007/0211174 A1 | 9/2007 | Putterman et al. |
| 2007/0220575 A1 | 9/2007 | Cooper |
| 2007/0233556 A1 | 10/2007 | Koningstein |
| 2007/0234213 A1 | 10/2007 | Krikorian et al. |
| 2007/0242880 A1 | 10/2007 | Stebbings |
| 2007/0253594 A1 | 11/2007 | Lunt |
| 2007/0260520 A1 | 11/2007 | Jha |
| 2007/0260671 A1 | 11/2007 | Harinstein |
| 2007/0282472 A1 | 12/2007 | Seidman |
| 2007/0294173 A1 | 12/2007 | Levy et al. |
| 2008/0002854 A1 | 1/2008 | Tehranchi et al. |
| 2008/0004116 A1 | 1/2008 | Van |
| 2008/0005241 A1 | 1/2008 | Cohen |
| 2008/0008348 A1 | 1/2008 | Metois |
| 2008/0010373 A1 | 1/2008 | Tojo |
| 2008/0027931 A1 | 1/2008 | Lu |
| 2008/0034396 A1 | 2/2008 | Lev |
| 2008/0051029 A1 | 2/2008 | Witteman |
| 2008/0052783 A1 | 2/2008 | Levy |
| 2008/0059211 A1 | 3/2008 | Brock |
| 2008/0059285 A1 | 3/2008 | Hamoui |
| 2008/0059461 A1 | 3/2008 | Brock et al. |
| 2008/0059536 A1 | 3/2008 | Brock |
| 2008/0082405 A1 | 4/2008 | Martinez et al. |
| 2008/0101604 A1 | 5/2008 | Kocher |
| 2008/0109306 A1 | 5/2008 | Maigret |
| 2008/0109369 A1 | 5/2008 | Su |
| 2008/0152146 A1 | 6/2008 | Conrado et al. |
| 2008/0154401 A1 | 6/2008 | Wang |
| 2008/0154739 A1 | 6/2008 | Kalaboukis |
| 2008/0155701 A1 | 6/2008 | Martinez et al. |
| 2008/0162228 A1 | 7/2008 | Mechbach |
| 2008/0162449 A1 | 7/2008 | Chao-Yu et al. |
| 2008/0165960 A1 | 7/2008 | Woo |
| 2008/0178302 A1 | 7/2008 | Brock |
| 2008/0209502 A1 | 8/2008 | Seidel |
| 2008/0235200 A1 | 9/2008 | Washington |
| 2008/0235795 A1 | 9/2008 | Ishikawa |
| 2008/0240490 A1 | 10/2008 | Finkelstein |
| 2008/0249961 A1 | 10/2008 | Harkness |
| 2008/0275763 A1 | 11/2008 | Tran |
| 2008/0317278 A1 | 12/2008 | Lefebvre et al. |
| 2009/0006225 A1 | 1/2009 | Multerer |
| 2009/0030651 A1 | 1/2009 | Wold |
| 2009/0052784 A1 | 2/2009 | Covell et al. |
| 2009/0063279 A1 | 3/2009 | Ives |
| 2009/0083228 A1 | 3/2009 | Shatz et al. |
| 2009/0106442 A1 | 4/2009 | Liu |
| 2009/0119169 A1 | 5/2009 | Chandratillake |
| 2009/0129755 A1 | 5/2009 | Rakib |
| 2009/0144325 A1 | 6/2009 | Chastagnol |
| 2009/0144772 A1 | 6/2009 | Fink |
| 2009/0165031 A1 | 6/2009 | Li |
| 2009/0313078 A1 | 12/2009 | Cross |
| 2010/0017487 A1 | 1/2010 | Patinkin |
| 2010/0119208 A1 | 5/2010 | Davis |
| 2010/0191819 A1 | 7/2010 | Alspector et al. |
| 2012/0011105 A1 | 1/2012 | Brock et al. |
| 2012/0284803 A1 | 11/2012 | Wang et al. |
| 2013/0006946 A1 | 1/2013 | Prahlad et al. |
| 2013/0022333 A1 | 1/2013 | Takahashi |
| 2013/0085825 A1 | 4/2013 | Davis et al. |
| 2014/0020116 A1 | 1/2014 | Chastagnal et al. |
| 2015/0074748 A1 | 3/2015 | Brock et al. |
| 2015/0302886 A1 | 10/2015 | Brock et al. |

FOREIGN PATENT DOCUMENTS

| | | |
|---|---|---|
| WO | WO02065782 | 8/2002 |
| WO | WO02103968 | 12/2002 |
| WO | 09042899 | 4/2009 |
| WO | WO09100093 | 8/2009 |
| WO | WO09017049 | 9/2009 |

OTHER PUBLICATIONS

Amazon Mechanical Turk Developer Guide, 2006, 165 pp., API Version Oct. 31, 2006.

Amazon Mechanical Turk Developer Guide, Dec. 16, 2005, 94 pp.

Amazon Mechanical Turk Release Notes, Release Date Oct. 13, 2005 (Oct. 2005).

Amazon's Mechanical Turk, thread from SlashDot, started Nov. 4, 2005.

Baluja et al, Content Fingerprinting Using Wavelets, 3rd European Conference on Visual Media Production, Nov. 2006.

Batlle et al., "Automatic Song Identification in Noisy Broadcast Audio," in Proc. of the SIP, Aug. 2002

Boutin, Crowdsourcing, Consumers as Creators, Business Week, Jul. 13, 2006.

Brin, et al., "Copy Detection Mechanisms for Digital Documents," SIGMOD '95, Proceedings of the 1995 ACM SIGMOD international conference on Management of data, pp. 398-409, 1995.

Cano et al, "A Review of Audio Fingerprinting," Journal of VLSI Signal Processing, 41, 271, 272, 2005.

Crowdsourcing article from Wikipedia, Dec. 18, 2006

Covell et al, Advertisement Detection and Replacement using Acoustic and Visual Repetition, IEEE Int'l Workshop on Multimedia Signal Processing, Oct. 2006.

Ghias, et al., "Query By Humming: Musical Information Retrieval in an Audio Database," ACM Multimedia, pp. 231-236, Nov. 1995.

Haitsma, et al, "A Highly Robust Audio Fingerprinting System," Proc. Intl Conf on Music Information Retrieval, 2002.

Heintze, "Scalable Document Fingerprinting (Extended Abstract)," Bell Laboratories, 1996.

Howe et al, Crowdsourcing blog at crowdsourcing,typepad.com, Dec. 17, 2006, as retrieved from web.archive.org on Apr. 23, 2008.pdf.

(56) References Cited

OTHER PUBLICATIONS

Howe et al, Crowdsourcing blog at crowsourcing.typepad.com, Nov. 7, 2006, as retrieved from web.archive.org on Apr. 23, 2008. pdf.
Howe, Look Who's Crowdsourcing, Wired Magazine, Jun. 2006.
Howe, The Rise of Crowdsourcing, Wired Magazine, Jun. 2006.
Kageyama et al, "Melody Retrieval with Humming," Proceedings of Int. Computer Music Conference (ICMC), 1993.
Kalker et al, "Robust Identification of Audio Using Watermarking and Fingerprinting," in Multimedia Security Handbook, CRC Press, 2005.
Konstantinou, et al., "A Dynamic JAVA-Based Intelligent Interface for Online Image Database Searches," VISUAL'99, LNCS 1614, pp. 211-220, 1999.
Liu et al, U.S. Appl. No. 60/856,501, filed Nov. 3, 2006, entitled "Rights Management" (which serves as a priority application for published US application 20080109369).
Manber, "Finding Similar Files in a Large File System," Jan. 1994 Winter USENIX Technical Conference, 10 pages (as submitted Oct. 1993).
Release-Amazon Mechanical Turk on Dec. 1, 2006 (Dec. 1, 2006).
von Ahn, Human Computation, CMU PhD Thesis, Dec. 7, 2005, 87pp.
Wold et al., "Content-Based Classification, Search and Retrieval of Audio," IEEE MultiMedia 1996.
Cheung, et al, Efficient Video Similarity Measurement with Video Signature, IEEE Trans. on Circuits and Systems for Video Technology, 13.1, pp. 59-74, 2003.
Hoad, et al, Methods for Identifying Versioned and Plagiarized Documents, Journal of the American Society for Information Science and Technology, 54.3, pp. 203-215, 2003.
Ke, et al, Efficient Near-Duplicate Detection and Sub-Image Retrieval, Intel Research Report IRP-TR-04-03, 2004.
Popescu, et al, Exposing Digital Forgeries in Color Filter Array Interpolated Images, IEEE Trans. on Signal Processing 53.10, pp. 3948-3959, 2005.
Brin, et al, Copy detection mechanisms for digital documents, ACM SIGMOD Record, vol. 24, No. 2, 1995.
DRM Watch, Guba Introduces Video Fingerprint Filtering, Jul. 27, 2006, http://www.drmwatch.com/article.php/3623091.
Email about the product "Sentinel", Nov. 14, 2006.
Global File Registry, Technical White Paper, Draft 1-26, May 2006.
Krikorian, U.S. Appl. No. 60/823,066, filed Aug. 21, 2006 (priority document for US20070168543).
Meckbach, U.S. Appl. No. 60/870,817, filed Dec. 19, 2006 (priority document for US20080162228).
Assignee's U.S. Appl. No. 13/909,834, filed Jun. 4, 2013.
Jul. 3, 2014 Notice of Appeal, Jan. 3, 2014 final Office Action, and Dec. 3, 2013 Amendment; all from assignee's U.S. Appl. No. 13/686,541 (published as 2013-0085825).
Jul. 9, 2014 Office Action, and application specification and drawings with a filing date of May 6, 2014; all from assignee's U.S. Appl. No. 14/271,297.
U.S. Appl. No. 60/823,066, filed Aug. 21, 2006.
Nov. 21, 2014 Notice of Allowance, Notice of Allowability and Interview Summary; Oct. 29, 2014 Amendment including Interview Summary; Sep. 9, 2014 Interview Summary; Sep. 4, 2014 Amendment including Interview Summary; Jul. 9, 2014 non-final Office Action; all from U.S. Appl. No. 14/271,297.
Assignee's U.S. Appl. No. 13/937,995, filed Jul. 9, 2013.
Apr. 27, 2016 Issue Notification; Jan. 20, 2016 Notice of Allowance and Interview Summary; Sep. 11, 2015 Amendment and Terminal Disclaimer; Jun. 11, 2015 Non-final Office Action; all from assignee's U.S. Appl. No. 14/288,124 (published as US 2015-0074748 A1).
May 7, 2014 Issue Notification; Jan. 15, 2014 Notice of Allowance and Interview Summary; Dec. 12, 2013 Amendment; Jun. 14, 2013 Non-final Office Action; Jan. 12, 2012 Amendment submitted with RCE; Oct. 13, 2011 Final Rejection; Aug. 24, 2011 Examiner's Interview Summary; Aug. 15, 2011 Amendment; Apr. 13, 2011 non-final Rejection; Feb. 23, 2011 Amendment submitted with RCE; Dec. 21, 2010 final Rejection; Oct. 1, 2010 Amendment; Jun. 25, 2010 non-final Rejection; Apr. 23, 2010 Examiner's interview summary; Apr. 19, 2010 Amendment; Jan. 13, 2010 non-final Office Action; Dec. 7, 2009 Amendment submitted with RCE; Sep. 3, 2009 final Rejection; Jun. 22, 2009 Amendment; Mar. 17, 2009 non-final Rejection; all from assignee's U.S. Appl. No. 11/512,067 (issued as U.S. Pat. No. 8,738,749).
Mar. 11, 2016 non-final Office Action; Jan. 14, 2016 Office of Petitions Decision; May 27, 2015 Petition for review by the Office of Petitions; Apr. 22, 2014 claims as filed; all from assignee's U.S. Appl. No. 14/258,633 (published as US 2015-0302886 A1).
Apr. 2, 2014 Issue Notification; Nov. 25, 2013 Notice of Allowance and Interview Summary; Nov. 5, 2013 Amendment and Interview summary; Jun. 6, 2013 Non-final Office Action; Jun. 11, 2012 Amendment submitted with RCE.
Feb. 10, 2012 final Rejection; Dec. 19, 2011 Amendment; Sep. 19, 2011 non-final Rejection; Nov. 1, 2010 Amendment submitted with RCE; Jun. 30, 2010 final Rejection; May 17, 2010 Amendment; Jan. 11, 2010 non-final Rejection; all from assignee's U.S. Appl. No. 11/655,748 (issued as U.S. Pat. No. 8,707,459).
Amazon Mechanical Turk Release Notes, Release Date Oct. 13, 2005.
BayTSP, Digital Tracking+ Security+ Protection, May 17, 2006 www.baytsp.com/solutions_faq_html.
*BMG Canada Inc.*, v. *Doe*, 2005 FCA 193, May 19, 2005.
*BMG Canada Inc.*, v. *Doe*, Cross Examination of Gary Millin, Court File No. T-292-04, Feb. 6, 2004.
Campbell et al. Copy Detection Systems for Digital Documents. IEEE 2000. Retrieved online May 31, 2017. file:///a/Users/jreagan/Documents/e-Red%20Folder/14930298/NPL.pdf.
Cheung et al., Efficient Video Similarity Measurement and Search, Department of Electrical Engineering and Computer Sciences, University of California, Berkeley, 2000.
Cowboyneal, Slashdot, Microsoft Seeking to Patent Automatic Censorship, May 4, 2006.
Fetterly et al., Detecting Phrase-Level Duplication on the World Wide Web, Aug. 2005.
Fetterly et al., On the Evolution of Clusters of Near-Duplicate Web Pages, Oct. 2004.
U.S. Appl. No. 60/975,158, filed Sep. 25, 2007 (and a priority application for 20080109369).
Global File Registry, Global File Registry: The economic, scalable, solution for removing infringing content on the Internet, Aug. 23, 2006, www.globalfileregistry.com.
iCopyright on copyright, Jun. 13, 2006, www.datadepth.com/.
Indyk et al., Locality-Preserving Hashing in Multidimensional Spaces, 1997.
Manber, Finding Similar Files in a Large File System, Department of Computer Science, the University of Arizona, Tucson Arizona, Oct. 1993.
Marc, P2P File Sharing: Altnet Registry is About Money, Not Protection, Aug. 3, 2006, http://www.p2p-webloK.com/50226711/alnet_registry_is_about_money_not_protection.php.
Nov. 27, 2018 Amendment and Jun. 20, 2017 Office Action, both from assignees U.S. Appl. No. 13/686,541.
Numly Numbers, Web2.0+ Copyright=Copyright 2.0, Jun. 8, 2006 www.numly.com/numly/default.asp.
Patent Office file re U.S. Appl. No. 60/870,817 by Meckbach, Method and Device for the Production of Advertising, filed Dec. 19, 2006 (provisional priority case for US20080162228 to Trivid).
Patent Office file re U.S. Appl. No. 60/891,764 by Weidel, Associating Rights to Multimedia Content, filed Feb. 27, 2007 (provisional priority case for US20080209502 to Motion Picture Laboratories).
Patent Office file re U.S. Appl. No. 60/910,717 by Harkness, Digital Rights Management and Audience Measurement Systems and Methods, filed Apr. 9, 2007 (provisional priority case for US20080249961 to Nielsen).
Patent Office file re U.S. Appl. No. 60/914,168 by Harkness, Hardware and Software Architecture to Protect Against Unauthorized Copying of Copyrighted Content, filed Apr. 26, 2007 (provisional priority case for US20080249661 to Nielsen).

(56) References Cited

OTHER PUBLICATIONS

Patent Office file re U.S. Appl. No. 60/919,466 by Harkness, Digital Rights Management and Audience Measurement Systems and Methods, filed Mar. 22, 2007 (provisional priority case for US20080249961).

Patent Office file re U.S. Appl. No. 60/939,527 by Harkness, Digital Rights Management and Audience Measurement Systems and Methods, filed May 22, 2007 (provisional priority case for US20080249961 to Nielsen).

Patent Office file re U.S. Appl. No. 60/957,446 by Covell, Fast and Accurate Detection and Classification of Matches Between Time-Based Media, filed Aug. 22, 2007 (provisional priority case for US20090052784 to Google).

Patent Office file re U.S. Appl. No. 60/968,725 by Ives, Contextual Ads for Video, filed Aug. 29, 2007 (provisional priority case for US20090063279 to TVEyes).

Patent Office file re U.S. Appl. No. 61/029,155 by Ramaswamy, Method and Apparatus to Control the Transmission of Media Content, filed Feb. 15, 2008 (provisional priority case for US20080249961 to Nielsen).

Petrovic et al, U.S. Appl. No. 60/833,991, filed Jul. 28, 2006, entitled "Signal Continuity Assessment Using Embedded Watermarks" (which serves as a priority application for US published application for 20080002854).

Popescu et al., Exposing Digital Forgeries by Detecting Duplicated Image Regions, Department of Computer Science, Dartmouth College, 2005.

Prosecution excerpts from U.S. Appl. No. 12/048,072, filed Mar. 8, 2008, including applicant submissions dated Mar. 13, 2008, Sep. 14, 2010, Apr. 6, 2011, Jun. 14, 2012, Aug. 7, 2013, Sep. 19, 2013, Apr. 9, 2014, May 12, 2015, and Office papers dated Aug. 10, 2010, Dec. 13, 2010, Mar. 4, 2011, Jun. 24, 2011, Oct. 15, 2013, Feb. 12, 2015, Jul. 10, 2015.

Prosecution excerpts from U.S. Appl. No. 13/686,541, filed Nov. 27, 2012, including applicant submissions dated Nov. 27, 2012, Apr. 10, 2013, Dec. 3, 2013, and Feb. 3, 2015, and Office documents dated Apr. 9, 2013, Sep. 3, 2013 and Jan. 3, 2014.

Riya, Visual Search, www.riya.com.

SNOCAP, Services, Sell Your Music, Aug. 23, 2006 http://www.snocap.com/sell/.

U.S. Appl. No. 60/753,652, filed Dec. 23, 2005. cited by applicant.

U.S. Appl. No. 60/856,501, filed Nov. 3, 2006 (and a priority application for US20080109369 to Google).

U.S. Appl. No. 60/927,940, filed May 3, 2007, which serves as priority application for 20080275763 to Google.

U.S. Appl. No. 61/026,444, filed Feb. 5, 2008 (and a priority application for WO09100093, and U.S. Appl. No. 12/865,807, to Dolby Laboratories).

U.S. Appl. No. 15/727,961, filed Oct. 9, 2017.

U.S. Appl. No. 60/975,158, filed Sep. 25, 2007 (and a priority application for US20080109369 to Google).

* cited by examiner

METHODS FOR IDENTIFYING AUDIO OR VIDEO CONTENT

RELATED APPLICATION DATA

This application is a continuation of U.S. patent application Ser. No. 14/519,973, filed Oct. 21, 2014 (now U.S. Pat. No. 9,292,513) which is a continuation of U.S. patent application Ser. No. 13/909,834, filed Jun. 4, 2013 (now U.S. Pat. No. 8,868,917), which is a continuation of U.S. patent application Ser. No. 13/714,930, filed Dec. 14, 2012 (now U.S. Pat. No. 8,458,482) which is a continuation of U.S. patent application Ser. No. 12/114,612, filed May 2, 2008 (now U.S. Pat. No. 8,341,412), which is a division of U.S. patent application Ser. No. 11/613,891, filed Dec. 20, 2006 (published as US 2007-0162761 A1), which claims priority to provisional application 60/753,652, filed Dec. 23, 2005. Each of the above patent documents is hereby incorporated herein by reference in its entirety.

Some of the subject matter herein is related to that in various of the assignee's other patent applications, including Ser. No. 10/723,240, filed Nov. 26, 2003 (published as US20040213437); Ser. No. 10/979,770, filed Nov. 1, 2004 (now U.S. Pat. No. 7,314,162); and Ser. No. 11/132,724, filed May 18, 2005 (published as US20050288952).

TECHNICAL FIELD

The technology detailed herein spans a range of subject matter, including identifying audio/video entertainment content.

BACKGROUND

Certain implementations of the present technology make use of Amazon's Mechanical Turk service. Amazon's Turk web site explains:

Amazon Mechanical Turk provides a web services API for computers to integrate Artificial Artificial Intelligence directly into their processing by making requests of humans. Developers use the Amazon Mechanical Turk web services API to submit tasks to the Amazon Mechanical Turk web site, approve completed tasks, and incorporate the answers into their software applications. To the application, the transaction looks very much like any remote procedure call—the application sends the request, and the service returns the results. In reality, a network of humans fuels this Artificial Intelligence by coming to the web site, searching for and completing tasks, and receiving payment for their work.

All software developers need to do is write normal code. The pseudo code below illustrates how simple this can be.

```
read (photo);
photoContainsHuman = callMechanicalTurk(photo);
if (photoContainsHuman == TRUE){
    acceptPhoto;
}
else {
    rejectPhoto;
}
```

More information about Amazon's Mechanical Turk service is provided in the attached Appendix A (Amazon Mechanical Turk Developer Guide, 2006, 165 pp., API Version 10-31-2006).

The Mechanical Turk service may be regarded as a structured implementation of a technology commonly termed "crowdsourcing"—employing a group of outsiders to perform a task. Wikipedia explains:

"Crowdsourcing" is a neologism for a business model that depends on work being done outside the traditional company walls: while outsourcing is typically performed by lower paid professionals, crowdsourcing relies on a combination of volunteers and low-paid amateurs who use their spare time to create content, solve problems, or even do corporate R&D. The term was coined by *Wired* magazine writer Jeff Howe and editor Mark Robinson in June 2006.

Crowds targeted for crowdsourcing include garage scientists, amateur videographers, freelancers, photo enthusiasts, data companies, writers, smart mobs and the electronic herd.

Overview

While not a new idea, crowdsourcing is becoming mainstream. Open source projects are a form of crowdsourcing that has existed for years. People who may not know one another work together online to create complex software such as the Linux kernel, and the Firefox browser. In recent years internet technology has evolved to allow non-technical people to participate in online projects. Just as important, crowdsourcing presumes that a large number of enthusiasts can outperform a small group of experienced professionals.

Advantages

The main advantages of crowdsourcing is that innovative ideas can be explored at relatively little cost. Furthermore, it also helps reduce costs. For example if customers reject a particular design, it can easily be scrapped. Though disappointing, this is far less expensive than developing high volumes of a product that no one wants. Crowdsourcing is also related to terms like Collective Customer Commitment (CCC) and Mass Customisation. Collective Customer Commitment (CCC) involves integrating customers into innovation processes. It helps companies exploit a pool of talent and ideas and it also helps firms avoid product flops. Mass Customisation is somewhat similar to collective customer commitment; however, it also helps companies avoid making risky decisions about what components to prefabricate and thus avoids spending for products which may not be marketable later.

Types of Crowdsourced Work

Steve Jackson Games maintains a network of MIB (Men In Black), who perform secondary jobs (mostly product representation) in exchange for free product. They run publicly or semi-publicly announced play-tests of all their major books and game systems, in exchange for credit and product. They maintain an active user community online, and have done so since the days of BBSes.

Procter & Gamble employs more than 9000 scientists and researchers in corporate R&D and still have many problems they can't solve. They now post these on a website called InnoCentive, offering large cash rewards to more than 90,000 'solvers' who make up this network of backyard scientists. P&G also works with NineSigma, YourEncore and Yet2.

Amazon Mechanical Turk co-ordinates the use of human intelligence to perform tasks which computers are unable to do.

YRUHRN used Amazon Mechanical Turk and other means of crowdsourcing to compile content for a book published just 30 days after the project was started.

iStockphoto is a website with over 22,000 amateur photographers who upload and distribute stock photographs. Because it does not have the same margins as a professional outfit like Getty Images it is able to sell photos for a low price. It was recently purchased by Getty Images.

Cambrian House applies a crowdsourcing model to identify and develop profitable software ideas. Using a simple voting model, they attempt to find sticky software ideas that can be developed using a combination of internal and crowdsourced skills and effort.

A Swarm of Angels is a project to utilize a swarm of subscribers (Angels) to help fund, make, contribute, and distribute, a £1 million feature film using the Internet and all digital technologies. It aims to recruit earlier development community members with the right expertise into paid project members, film crew, and production staff.

The Goldcorp Challenge is an example of how a traditional company in the mining industry used a crowdsource to identify likely veins of gold on its Red Lake Property. It was won by Fractal Graphics and Taylor-Wall and Associates of Australia but more importantly identified 110 drilling targets, 50% of which were new to the company.

CafePress and Zazzle, customized products marketplaces for consumers to create apparel, posters, cards, stamps, and other products.

Marketocracy, to isolating top stock market investors around the world in head to head competition so they can run real mutual funds around these soon-to-be-discovered investment super-stars.

Threadless, an Internet-based clothing retailer that sells t-shirts which have been designed by and rated by its users.

Public Insight Journalism, A project at American Public Media to cover the news by tapping the collective and specific intelligence of the public. Gets the newsroom beyond the usual sources, uncovers unexpected expertise, stories and new angles.

External Links And References

The Rise of Crowdsourcing, Wired June 2006.

Crowdsourcing: Consumers as Creators, BusinessWeek July 2006.

SUMMARY

The following text presents a simplified, incomplete summary in order to provide an orientation to certain aspects of the disclosed subject matter. This Summary is not an extensive overview. It is not intended to identify key/critical elements or to delineate the scope of the claimed subject matter. Its sole purpose is to present some concepts in a simplified form as a prelude to the more detailed description that follows.

In accordance with certain embodiments of the present technology, Amazon's Mechanical Turk system, or similar crowdsourcing arrangements, are employed to match a first item of visual or audio entertainment content to a counterpart in a universe of such items.

For example, consider a user social networking site such as YouTube (now Google) that distributes "user generated content" (e.g., video files), and employs fingerprinting to recognize media content that should not be distributed. The site may check a video file at the time of its uploading with a fingerprint recognition system (e.g., of the sort offered by Audible Magic, or Gracenote). If no clear match is identified, the video may be indexed and stored on YouTube's servers, available for public downloading. Meanwhile, the content can be queued for review by one or more crowdsource reviewers. They may recognize it as a clip from the old TV sitcom "I Love Lucy"—perhaps digitally rotated 3 degrees to avoid fingerprint detection. This tentative identification is returned to YouTube from the API call. YouTube can check the returning metadata against a title list of works that should not be distributed (e.g., per the request of copyright owners), and may discover that "I Love Lucy" clips should not be distributed. It can then remove the content from public distribution. Additionally, the fingerprint database can be updated with the fingerprint of the rotated version of the I Love Lucy clip, allowing it to be immediately recognized the next time it is encountered. The foregoing and other examples, features and advantages of the present technology will be more apparent from the following Detailed Description.

DETAILED DESCRIPTION

Figure 1:
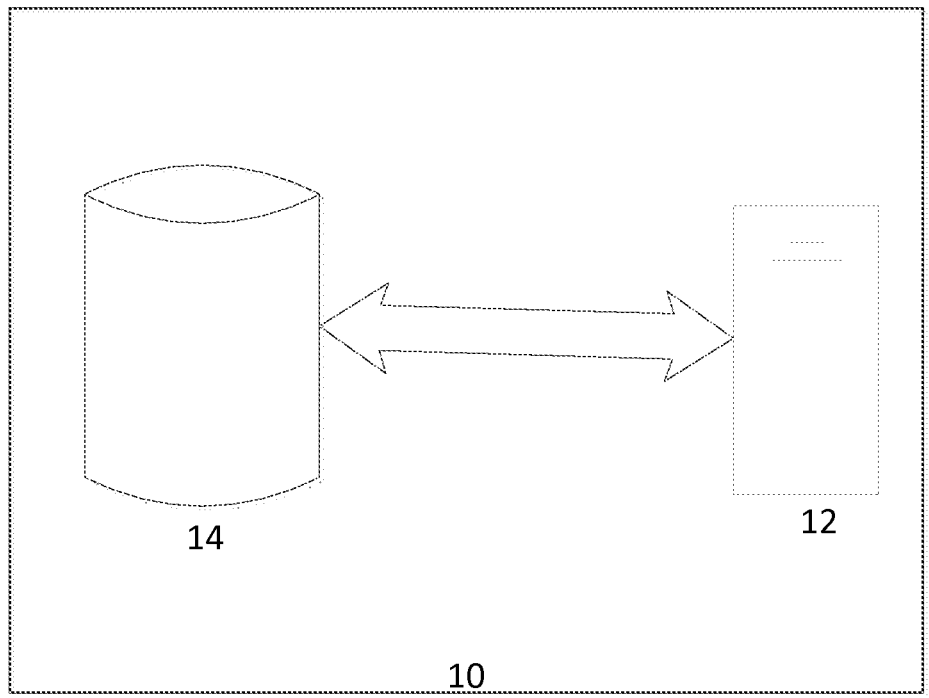
FIG. 1 is a diagram showing some components of an example computer system.

One use of the Mechanical Turk service (and similar crowdsourcing technologies) is in connection with computationally difficult tasks, such as identification of audio, video and imagery content. These tasks are sometimes addressed by so-called "fingerprint" technology, which seeks to generate a "robust hash" of content (e.g., distilling a digital file of the content down to perceptually relevant features), and then compare the thus-obtained fingerprint against a database of reference fingerprints computed from known pieces of content, to identify a "best" match. Such technology is detailed, e.g., in Haitsma, et al, "A Highly Robust Audio Fingerprinting System," Proc. Intl Conf on Music Information Retrieval, 2002; Cano et al, "A Review of Audio Fingerprinting," Journal of VLSI Signal Processing, 41, 271, 272, 2005; Kalker et al, "Robust Identification of Audio Using Watermarking and Fingerprinting," in Multimedia Security Handbook, CRC Press, 2005, and in patent documents WO02/065782, US20060075237, US20050259819, and US20050141707.

A related technology is facial recognition—matching an unknown face to a reference database of facial images. Again, each of the faces is distilled down to a characteristic set of features, and a match is sought between an unknown feature set, and feature sets corresponding to reference images. (The feature set may comprise eigenvectors or shape primitives.) Patent documents particularly concerned with such technology include US20020031253, U.S. Pat. No. 6,292,575, U.S. Pat. No. 6,301,370, U.S. Pat. No. 6,430,306, U.S. Pat. No. 6,466,695, and U.S. Pat. No. 6,563,950.

These are examples of technology that relies on "fuzzy" matching. The fingerprint derived from the unknown content often will not exactly match any of the reference fingerprints in the database. Thus, the database must be searched not just for the identical content fingerprint, but also for variants.

Expanding the search to include variants hugely complicates—and slows—the database search task. To make the search tractable, one approach is to prune the database— identifying excerpts thereof that are believed to be relatively likely to have a match, and limiting the search to those excerpts (or, similarly, identifying excerpts that are believed relatively unlikely to have a match, and not searching those excerpts).

The database search may locate several reference fingerprints that are similar to the fingerprint of the unknown content. The identification process then seeks to identify a "best" match, using various algorithms.

Such content identification systems can be improved by injecting a human into the process—by the Mechanical Turk service or similar systems.

In one particular arrangement, the content identification system makes an assessment of the results of its search, e.g., by a score. A score of 100 may correspond to a perfect match between the unknown fingerprint and a reference fingerprint. Lower scores may correspond to successively less correspondence. (At some lower score, $S_x$, (perhaps 60) the system may decide that there is no suitable match, and a "no-match" result is returned, with no identification made.)

Above some threshold score, $S_y$, (perhaps 70) the system may be sufficiently confident of the result that no human intervention is necessary. At scores below $S_y$, the system may make a call through the Mechanical Turk service for assistance.

The Mechanical Turk can be presented the unknown content (or an excerpt thereof), and some reference content, and asked to make a comparison. (The reference content may be stored in the fingerprint database, or may be readily obtainable through use of a link stored in the reference database.)

A single item of reference content can be provided for comparison with the unknown content, or several items of reference content can be provided. (Again, excerpts may be used instead of the complete content objects. Depending on the application, the content might be processed before sending to the crowdsource engine, e.g., removing metadata (such as personally identifiable information: name, driver license number, etc.) that is printed on, or conveyed with, the file.)

The requested comparison can take different forms. The service can be asked simply whether two items appear to match. Or it can be asked to identify the best of several possible matches (or indicate that none appears to match). Or it can be asked to give a relative match score (e.g., 0-100) between the unknown content and one or more items reference content.

In many embodiments, a query is referred to several different humans (e.g., 2-50) through the Mechanical Turk service, and the returned results are examined for consensus on a particular answer. In some queries (e.g., does Content A match Content B? Or is Content A a better match to Content C?), a "vote" may be taken. A threshold of consensus (e.g., 51%, 75%, 90%, 100%) may be required in order for the service response to be given weight in the final analysis. Likewise, in queries that ask the humans to provide a subjective score, the scores returned from plural such calls may be combined to yield a net result. (The high and/or low and/or outlier scores may be disregarded in computing the net result; weighting can sometimes be employed, as noted below.)

As suggested, the data returned from the Mechanical Turk calls may serve as a biasing factor, e.g., pushing an algorithmically determined output one way or another, to yield a final answer (e.g., a net score). Or the data returned from the Mechanical Turk calls may be treated as a definitive answer—with results from preceding processes disregarded.

Sometimes the database search may reveal several candidate matches, all with comparable scores (which may be above the threshold $S_y$). Again, one or more calls to the Mechanical Turk service may be invoked to decide which match is the best, from a subjective human standpoint.

Sometimes the Mechanical Turk service can be invoked even in situations where the original confidence score is below the threshold, $S_x$, which is normally taken as indicating "no match." Thus, the service can be employed to effectively reduce this threshold—continuing to search for potential matches when the rote database search does not yield any results that appear reliable.

The service can also be invoked to effect database pruning. For example, a database may be organized with several partitions (physical or logical), each containing information of a different class. In a facial recognition database, the data may be segregated by subject gender (i.e., male facial portraits, female facial portraits), and/or by age (15-40, 30-65, 55 and higher—data may sometimes be indexed in two or more classifications), etc. In an image database, the data may be segregated by topical classification (e.g., portrait, sports, news, landscape). In an audio database, the data may be segregated by type (spoken word, music, other). Each classification, in turn, can be further segregated (e.g., "music" may be divided into classical, country, rock, other). And these can be further segregated (e.g., "rock" may be classified by genre, such as soft rock, hard rock, Southern rock; by artist, e.g., Beatles, Rolling Stones, etc).

A call to the Mechanical Turk can be made, passing the unknown content object (or an excerpt thereof) to a human reviewer, soliciting advice on classification. The human can indicate the apparent class to which the object belongs (e.g., is this a male or female face? Is this music classical, country, rock, or other?). Or, the human can indicate one or more classes to which the object does not belong.

With such human advice (which, again, may involve several human reviewers, with a voting or scoring arrangement), the system can focus the database search where a correct match—if any—is more likely to be found (or avoid searching in unproductive database excerpts). This focusing can be done at different times. In one scenario it is done after a rote search is completed, in which the search results yield matches below the desired confidence level of $S_y$. If the database search space is thereafter restricted by application of human judgment, the search can be conducted again in the limited search space. A more thorough search can be undertaken in the indicated subset(s) of the database. Since a smaller excerpt is being searched, a looser criteria for a "match" might be employed, since the likelihood of false-positive matches is diminished. Thus, for example, the desired confidence level $S_y$ might be reduced from 70 to 65. Or the threshold $S_x$ at which "no match" is concluded, may be reduced from 60 to 55. Alternatively, the focusing can be done before any rote searching is attempted.

The result of such a human-focused search may reveal one or more candidate matches. The Mechanical Turk service may be called a second time, to vet the candidate matches—in the manner discussed above. This is one of several cases in which it may be desirable to cascade Mechanical Turk calls—the subsequent calls benefiting from the former.

In the example just-given, the first Mechanical Turk call aids in pruning the database for subsequent search. The second call aids in assessing the results of that subsequent search. In other arrangements, Mechanical Turk calls of the same sort can be cascaded.

For example, the Mechanical Turk first may be called to identify audio as music/speech/other. A second call may identify music (identified per the first call) as classical/country/rock/other. A third call may identify rock (identified per the second call) as Beatles/Rolling Stones/etc. Here, again, by iterative calling of a crowdsourcing service, a subjective judgment can be made that would be very difficult to achieve otherwise.

In some arrangements, human reviewers are pre-qualified as knowledgeable in a specific domain (e.g., relatively expert in recognizing Beatles music). This qualification can be established by an online examination, which reviewers are invited to take to enable them to take on specific tasks (often at an increased rate of pay). Some queries may be routed only to individuals that are pre-qualified in a particular knowledge domain. In the cascaded example just given, for example, the third call might be routed to one or more users with demonstrated expertise with the Beatles (and, optionally, to one or more users with demonstrated expertise with the Rolling Stones, etc). A positive identification of the unknown content as sounding like the Beatles would be given more relative weight if coming from a human qualified in this knowledge domain. (Such weighting may be taken into account when aggregating results from plural human reviewers. For example, consider an unknown audio clip sent to six reviewers, two with expertise in the Beatles, two with expertise in the Rolling Stones, and two with expertise in the Grateful Dead. Assume the Beatles experts identify it as Beatles music, the Rolling Stones experts identify it as Grateful Dead music, and the Grateful Dead experts identify it as Rolling Stones music. Despite the fact that there are tie votes, and despite the fact that no selection earned a majority of the votes, the content identification service that made these calls and is provided with these results may logically conclude that the music is Beatles.)

Calls to the Mechanical Turk service may request the human to provide metadata relevant to any content reviewed. This can include supposed artist(s), genre, title, subject, date, etc. This information (which may be ancillary to a main request, or may comprise the entirety of the request) can be entered into a database. For example, it can be entered into a fingerprint database—in association with the content reviewed by the human.

Desirably, data gleaned from Mechanical Turk calls are entered into the database, and employed to enrich its data—and enrich information that can be later mined from the database. For example, if unknown content X has a fingerprint $F_x$, and through the Mechanical Turk service it is determined that this content is a match to reference content Y, with fingerprint $F_y$, then a corresponding notation can be added to the database, so that a later query on fingerprint $F_x$ (or close variants thereof) will indicate a match to content Y. (E.g., a lookup table initially indexed with a hash of the fingerprint $F_x$ will point to the database record for content Y.)

Calls to outsourcing engines involve a time lag before results are returned. The calling system can generally cope, or be adapted to cope, with such lags.

Consider a user social networking site such as YouTube (now Google) that distributes "user generated content" (e.g., video files), and employs fingerprinting to recognize media content that should not be distributed. The site may check a video file at the time of its uploading with a fingerprint recognition system (e.g., of the sort offered by Audible Magic, or Gracenote). If no clear match is identified, the video may be indexed and stored on YouTube's servers, available for public downloading. Meanwhile, the content can be queued for review by one our more crowdsource reviewers. They may recognize it as a clip from the old TV sitcom "I Love Lucy"—perhaps digitally rotated 3 degrees to avoid fingerprint detection. This tentative identification is returned to YouTube from the API call. YouTube can check the returning metadata against a title list of works that should not be distributed (e.g., per the request of copyright owners), and may discover that "I Love Lucy" clips should not be distributed. It can then remove the content from public distribution. (This generally follows a double-check of the identification by a YouTube employee.) Additionally, the fingerprint database can be updated with the fingerprint of the rotated version of the I Love Lucy clip, allowing it to be immediately recognized the next time it is encountered.

If the content is already being delivered to a user at the moment the determination is made (i.e., the determination that the content should not be distributed publicly), then the delivery can be interrupted. An explanatory message can be provided to the user (e.g., a splash screen presented at the interruption point in the video).

Figure 2:
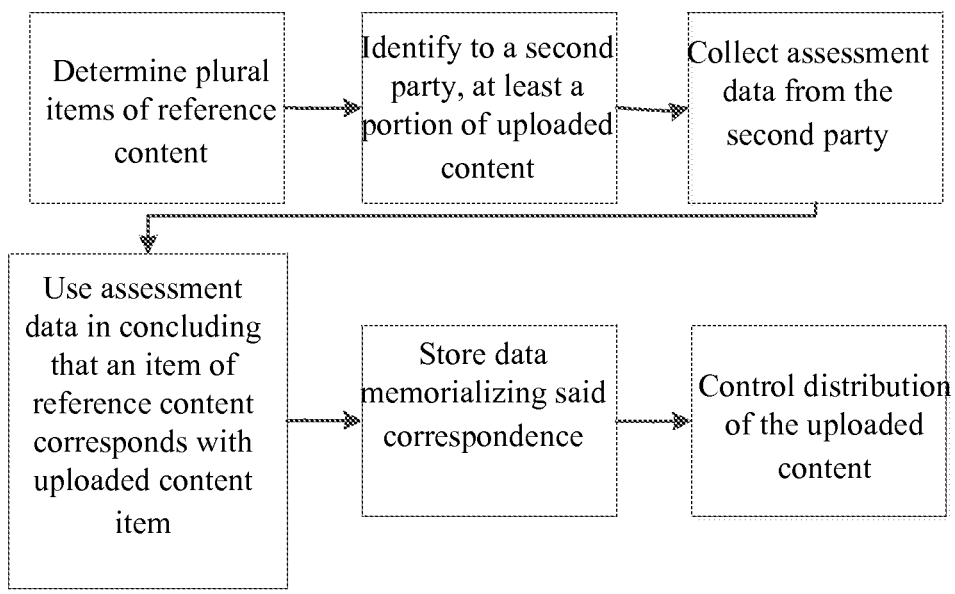
FIG. 2 is a flow diagram showing various acts accomplished through execution of code by a processor.
Figure 3:
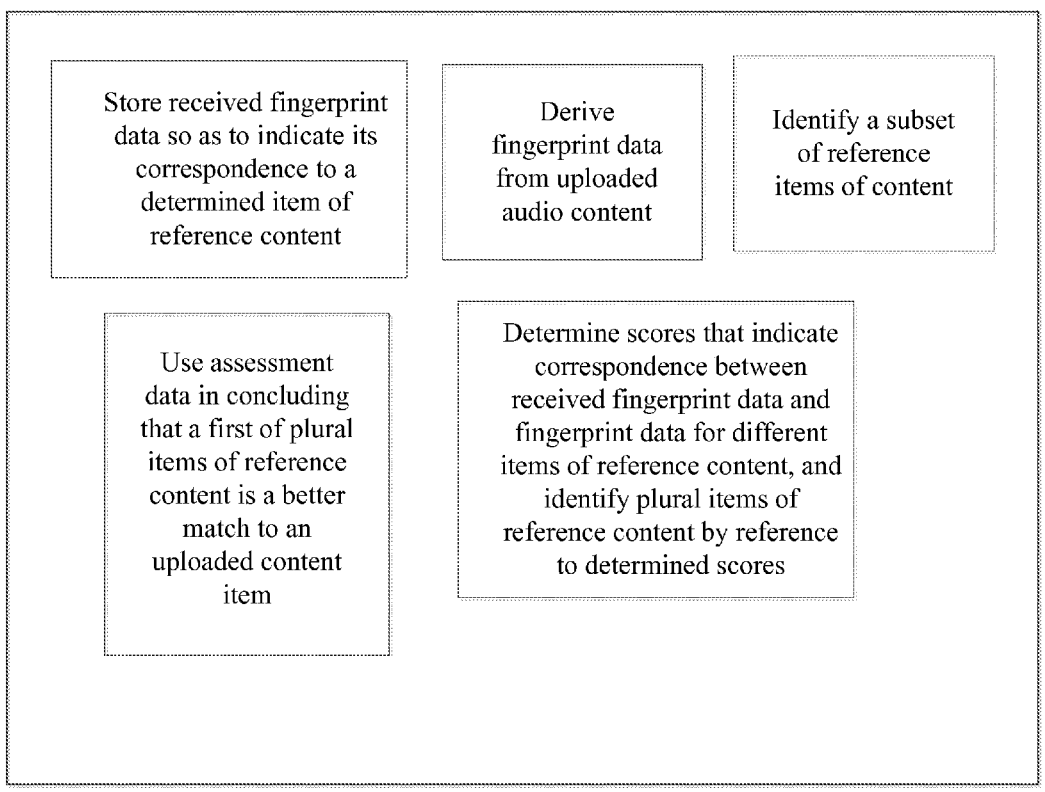
FIG. 3 is a diagram showing various additional acts accomplished through execution of code by a processor.
Figure 4:
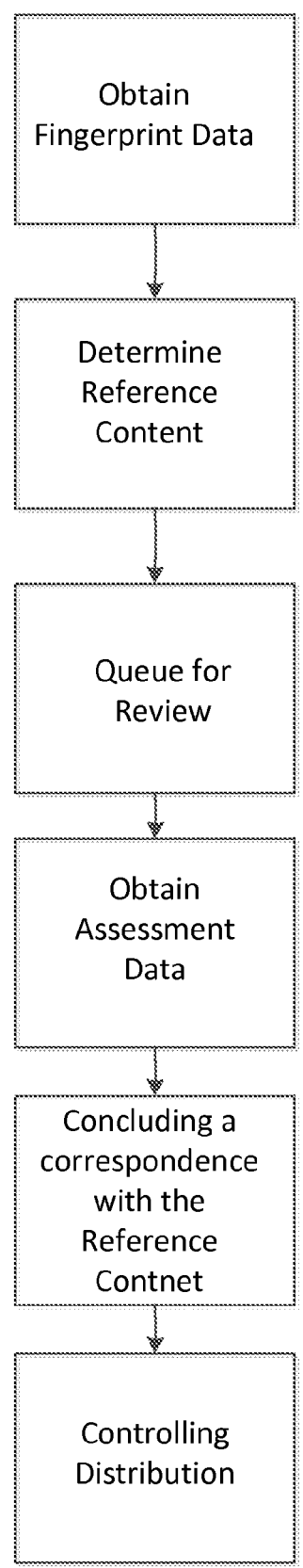
FIG. 4 is a flow diagram showing other various acts accomplished through execution of code by a processor.

FIG. 1 shows an example computer system (10) including a processor (12) and a computer-readable readable storage medium (14) storing executable code. The code when executed by the processor (12) can be configured to perform various acts. For example, FIG. 2 is a flow diagram showing some of these acts. FIG. 3 illustrates additional acts. FIG. 4 is a flow diagram showing other example acts.

Rotating a video by a few degrees is one of several hacks that can defeat fingerprint identification. (It is axiomatic that introduction of any new content protection technology draws hacker scrutiny. Familiar examples include attacks against Macrovision protection for VHS tapes, and against CSS protection for packaged DVD discs.) If fingerprinting is employed in content protection applications, such as in social networking sites (as outlined above) or peer-to-peer networks, its vulnerability to attack will eventually be determined and exploited.

Each fingerprinting algorithm has particular weaknesses that can be exploited by hackers to defeat same. An example will help illustrate.

A well known fingerprinting algorithm operates by repeatedly analyzing the frequency content of a short excerpt of an audio track (e.g., 0.4 seconds). The method determines the relative energy of this excerpt within 33 narrow frequency bands that logarithmically span the range 300 Hz—2000 Hz. A corresponding 32-bit identifier is then generated from the resulting data. In particular, a frequency band corresponds to a data bit "1" if its energy level is larger than that of the band above, and a "0" if its energy level is lower. (A more complex arrangement can also take variations over time into account, outputting a "1" only if the immediately preceding excerpt also met the same test, i.e., having a band energy greater than the band above.)

Such a 32 bit identifier is computed every hundredth of a second or so, for the immediately preceding 0.4 second excerpt of the audio track, resulting in a large number of "fingerprints." This series of characteristic fingerprints can be stored in a database entry associated with the track, or only a subset may be stored (e.g., every fourth fingerprint).

When an unknown track is encountered, the same calculation process is repeated. The resulting set of data is then compared against data earlier stored in the database to try and identify a match. (As noted, various strategies can be employed to speed the search over a brute-force search technique, which yields unacceptable search times.)

While the just-described technique is designed for audio identification, a similar arrangement can be used for video. Instead of energies in audio subbands, the algorithm can use average luminances of blocks into which the image is divided as the key perceptual features. Again, a fingerprint can be defined by determining whether the luminance in each block is larger or smaller than the luminance of the preceding block.

The just-reviewed fingerprinting algorithm is particularly detailed in the Haitsma paper, referenced above. Four paragraphs from that paper, further detailing fingerprint extraction, are reproduced below:

Most fingerprint extraction algorithms are based on the following approach. First the audio signal is segmented into frames. For every frame a set of features is computed. Preferably the features are chosen such that they are invariant (at least to a certain degree) to signal degradations. Features that have been proposed are well known audio features such as Fourier coefficients, Mel Frequency Cepstral Coefficients (MFFC), spectral flatness, sharpness, Linear Predictive Coding (LPC) coefficients and others. Also derived quantities such as derivatives, means and variances of audio features are used. Generally the extracted features are mapped into a more compact representation by using classification algorithms, such as Hidden Markov Models, or quantization. The compact representation of a single frame is referred to as a sub-fingerprint. The global fingerprint procedure converts a stream of audio into a stream of sub-fingerprints. One sub-fingerprint usually does not contain sufficient data to identify an audio clip. The basic unit that contains sufficient data to identify an audio clip (and therefore determining the granularity) will be referred to as a fingerprint-block.

The proposed fingerprint extraction scheme is based on this general streaming approach. It extracts 32-bit sub-fingerprints for every interval of 11.6 milliseconds. A fingerprint block consists of 256 subsequent sub-fingerprints, corresponding to a granularity of only 3 seconds. The audio signal is first segmented into overlapping frames. The overlapping frames have a length of 0.37 seconds and are weighted by a Hanning window with an overlap factor of 31/32. This strategy results in the extraction of one sub-fingerprint for every 11.6 milliseconds. In the worst-case scenario the frame boundaries used during identification are 5.8 milliseconds off with respect to the boundaries used in the database of pre-computed fingerprints. The large overlap assures that even in this worst-case scenario the sub-fingerprints of the audio clip to be identified are still very similar to the sub-fingerprints of the same clip in the database. Due to the large overlap subsequent sub-fingerprints have a large similarity and are slowly varying in time.

The most important perceptual audio features live in the frequency domain. Therefore a spectral representation is computed by performing a Fourier transform on every frame. Due to the sensitivity of the phase of the Fourier transform to different frame boundaries and the fact that the Human Auditory System (HAS) is relatively insensitive to phase, only the absolute value of the spectrum, i.e. the power spectral density, is retained.

In order to extract a 32-bit sub-fingerprint value for every frame, 33 non-overlapping frequency bands are selected. These bands lie in the range from 300 Hz to 2000 Hz (the most relevant spectral range for the HAS) and have a logarithmic spacing. The logarithmic spacing is chosen, because it is known that the HAS operates on approximately logarithmic bands (the so-called Bark scale). Experimentally it was verified that the sign of energy differences (simultaneously along the time and frequency axes) is a property that is very robust to many kinds of processing.

Additional information on deriving fingerprints is provided in the Cano paper, A Review of Audio Fingerprinting, referenced above. Three paragraphs from that reference—discussing linear transforms and similarity measures useful in fingerprinting—follow:

The idea behind linear transforms is the projection of the set of measurements to a new set of features. If the transform is suitably chosen, the redundancy is significantly reduced. There are optimal transforms in the sense of information packing and decorrelation properties, like Karhunen-Loeve (KL) or Singular Value Decomposition (SVD). These transforms, however, are problem dependent and computationally complex. For that reason, lower complexity transforms using fixed basis vectors are common. Most CBID methods therefore use standard transforms from time to frequency domain to facilitate efficient compression, noise removal and subsequent processing. Lourens, (for computational simplicity), and Kurth et al., (to model highly distorted sequences, where the time-frequency analysis exhibits distortions), use power measures. The power can still be seen as a simplified time-frequency distribution, with only one frequency bin.

The most common transformation is the Discrete Fourier Transform (DFT). Some other transforms have been proposed: the Discrete Cosine Transform (DCT), the Haar Transform or the Walsh-Hadamard Transform. Richly et al. did a comparison of the DFT and the Walsh-Hadamard Transform that revealed that the DFT is generally less sensitive to shifting. The Modulated Complex Transform (MCLT) used by Mihcak et al. and also by Burges et al. exhibits approximate shift invariance properties.

So far we have presented an identification framework that follows a template matching paradigm: both the reference patterns—the fingerprints stored in the database—and the test pattern—the fingerprint extracted from the unknown audio—are in the same format and are compared according to some similarity measure, e.g: hamming distance, a correlation and so on. In some systems, only the reference items are actually "fingerprints"—compactly modeled as a codebook or a sequence of indexes to HMMs. In these cases, the similarities are computed directly between the feature sequence extracted from the unknown audio and the reference audio fingerprints stored in the repository. In [E. Allamanche], the feature vector sequence is matched to the different codebooks using a distance metric. For each codebook, the errors are accumulated. The unknown item is assigned to the class which yields the lowest accumulated error. In [E. Bailie], the feature sequence is run against the fingerprints (a concatenation of indexes pointing at HMM sound classes) using the Viterbi algorithm. The most likely passage in the database is selected.

While little has been written about attacks targeting fingerprinting systems, a casual examination of possible attack scenarios reveals several possibilities. A true hacker will probably see many more. Four simple approaches are discussed below.

Radio Loudness Profiling

The reader may be familiar with different loudness profiles selectable on car radios, e.g., Jazz, Talk, Rock, etc. Each applies a different frequency equalization profile to the audio, e.g., making bass notes louder if the Rock setting is selected, and quieter if the Talk setting is selected, etc. The difference is often quite audible when switching between different settings.

However, if the radio is simply turned on and tuned to different stations, the listener is generally unaware of which loudness profile is being employed. That is, without the ability to switch between different profiles, the frequency equalization imposed by a particular loudness profile is typically not noticed by a listener. The different loudness profiles, however, yield different fingerprints.

For example, in the Rock setting, the 300 Hz energy in a particular 0.4 second excerpt may be greater than the 318 Hz energy. However, in the Talk setting, the situation may be reversed. This change prompts a change in the leading bit of the fingerprint.

In practice, an attacker would probably apply loudness profiles more complex than those commonly available in car radios—increasing and decreasing the loudness at many different frequency bands (e.g., 32 different frequency bands). Significantly different fingerprints may thus be produced. Moreover, the loudness profile could change with time—further distancing the resulting fingerprint from the reference values stored in a database.

Multiband Compression

Another process readily available to attackers is audio multiband compression, a form of processing that is commonly employed by broadcasters to increase the apparent loudness of their signal (most especially commercials). Such tools operate by reducing the dynamic range of a soundtrack—increasing the loudness of quiet passages on a band-by-band basis, to thereby achieve a higher average signal level. Again, this processing of the audio changes its fingerprint, yet is generally not objectionable to the listeners.

Psychoacoustic Processing

The two examples given above are informal attacks—common signal processing techniques that yield, as side-effects, changes in audio fingerprints. Formal attacks—signal processing techniques that are optimized for purposes of changing fingerprints—are numerous.

Some formal attacks are based on psychoacoustic masking. This is the phenomena by which, e.g., a loud sound at one instant (e.g., a drum beat) obscures a listener's ability to perceive a quieter sound at a later instant. Or the phenomena by which a loud sound at one frequency (e.g., 338 Hz) obscures a listener's ability to perceive a quieter sound at a nearby frequency (e.g., 358 Hz) at the same instant. Research in this field goes back decades. (Modern watermarking software employs psychoacoustic masking in an advantageous way, to help hide extra data in audio and video content.)

Hacking software, of course, can likewise examine a song's characteristics and identify the psychoacoustic masking opportunities it presents. Such software can then automatically make slight alterations in the song's frequency components in a way that a listener won't be able to note, yet in a way that will produce a different series of characteristic fingerprints. The processed song will be audibly indistinguishable from the original, but will not "match" any series of fingerprints in the database.

Threshold Biasing

Another formal attack targets fingerprint bit determinations that are near a threshold, and slightly adjusts the signal to swing the outcome the other way. Consider an audio excerpt that has the following respective energy levels (on a scale of 0-99), in the frequency bands indicated:

| 300 Hz | 318 Hz | 338 Hz | 358 Hz |
|--------|--------|--------|--------|
| 69     | 71     | 70     | 68     |

The algorithm detailed above would generate a fingerprint of {011 . . . } from this data (i.e., 69 is less than 71, so the first bit is '0'; 71 is greater than 70, so the second bit is '1'; 70 is greater than 68, so the third bit is '1').

Seeing that the energy levels are somewhat close, an attacker tool could slightly adjust the signal's spectral composition, so that the relative energy levels are as follows:

| 300 Hz  | 318 Hz  | 338 Hz | 358 Hz |
|---------|---------|--------|--------|
| [69] 70 | [71] 69 | 70     | 68     |

Instead of {011 . . . }, the fingerprint is now {101 . . . }. Two of the three illustrated fingerprint bits have been changed. Yet the change to the audio excerpt is essentially inaudible.

Exploiting Database Pruning

Other fingerprint hacking vulnerabilities arise from shortcuts employed in the database searching strategy—seeking to prune large segments of the data from further searching. For example, the system outlined above confines the large potential search space by assuming that there exists a 32 bit excerpt of the unknown song fingerprint that exactly matches (or matches with only one bit error) a 32 bit excerpt of fingerprint data in the reference database. The system looks at successive 32 bit excerpts from the unknown song fingerprint, and identifies all database fingerprints that include an excerpt presenting a very close match (i.e., 0 or 1 errors). A list of candidate song fingerprints is thereby identified that can be further checked to determine if any meets the looser match criteria generally used. (To allow non-exact fingerprint matches, the system generally allows up to 2047 bit errors in every 8192 bit block of fingerprint data.)

The evident problem is: what if the correct "match" in the database has no 32 bit excerpt that corresponds—with just 1 or 0 bit errors—to a 32 bit excerpt from the unknown song? Such a correct match will never be found—it gets screened out at the outset.

A hacker familiar with the system's principles will see that everything hinges on the assumption that a 32 bit string of fingerprint data will identically match (or match with only one bit error) a corresponding string in the reference database. Since these 32 bits are based on the strengths of 32 narrow frequency bands between 300 Hz and 2000 Hz, the spectrum of the content can readily be tweaked to violate this assumption, forcing a false-negative error. (E.g., notching out two of these narrow bands will force four bits of every 32 to a known state: two will go to zero—since these bands are lower in amplitude than the preceding bands, and two will go to one—since the following bands are higher in amplitude that these preceding, notched, bands). On average, half of these forced bits will be "wrong" (compared to the untweaked music), leading to two bit errors—violating the assumption on which database pruning is based.)

Attacks like the foregoing require a bit of effort. However, once an attacker makes the effort, the resulting hack can be spread quickly and widely.

The exemplary fingerprinting technique noted above (which is understood to be the basis for Gracenote's commercial implementation, MusicID, built from technology licensed from Philips) is not unique in being vulnerable to various attacks. All fingerprinting techniques (including the recently announced MediaHedge, as well as CopySense and RepliCheck) are similarly believed to have vulnerabilities that can be exploited by hackers. (A quandary for potential adopters is that susceptibility of different techniques to different attacks has not been a focus of academic attention.)

It will be recognized that crowdsourcing can help mitigate the vulnerabilities and uncertainties that are inherent in fingerprinting systems. Despite a "no-match" returned from the fingerprint-based content identification system (based on its rote search of the database for a fingerprint that matches that of the altered content), the techniques detailed herein allow human judgment to take a "second look." Such techniques can identify content that has been altered to avoid its correct identification by fingerprint techniques. (Again, once such identification is made, corresponding information is desirably entered into the database to facilitate identification of the altered content next time.)

It will be recognized that the "crowdsourcing" methodologies detailed above also have applicability to other tasks involved in the arrangements detailed in this specification, including all the documents incorporated by reference.

Implementation of systems according to the present technology is straightforward to artisans, e.g., using standard computer-, database-, software- and network-technology.

Although not particularly illustrated, it will be recognized that the methods described above can be implemented using general purpose (or special purpose) computers, e.g., comprising one or more CPUs, semiconductor memory, hard disks, networking connections, and input-output devices, as are conventional in the art. Software instructions for implementing the above-detailed methods can be stored on tangible media associated with such systems, e.g., disks and semiconductor memories.

To provide a comprehensive disclosure without unduly lengthening this specification, applicants incorporate-by-reference the documents referenced in this disclosure. In addition to those noted elsewhere, these incorporated documents include application Ser. No. 10/979,770 (now U.S. Pat. No. 7,314,162) and Ser. No. 11/132,724 (published as US20050288952); published applications US20030052768, US20030099379. US20030115459, US20030216988, US20040059953, US20040064415, US20040153663, US20040189441, US20040205030, US20040213437, US20040230527, US20040245330, US20050039057, US20050132235, US20050154924, and US20050171851, and issued U.S. Pat. Nos. 5,679,938, 5,679,940, 6,513,018, 6,597,775, 6,944,604, 6,965,889, and 6,968,328.

It is expressly contemplated that the technologies, features and analytical methods detailed herein can be incorporated into the methods/systems detailed in such other documents. Moreover, the technologies, features, and analytical methods detailed in those documents can be incorporated into the methods/systems detailed herein. (It will be recognized that the brief synopses of prior documents provided above naturally do not reflect all of the features found in such disclosures.)

In view of the wide variety of embodiments to which the principles and features discussed above can be applied, it should be apparent that the detailed embodiments are illustrative only and should not be taken as limiting the scope of the disclosed technology. Rather, I claim all such modifications as may come within the scope and spirit of the following claims and equivalents thereof.

I claim:

1. A system associated with an online content distribution site, comprising:

an input to receive user uploaded audio or visual content, the user uploaded audio or visual content having been uploaded by a user to the online content distribution site for distribution from the online content distribution site to the public;

one or more memory modules storing data representing a universe of reference content associated with the online content distribution site;

one or more processors programmed for:

i. generating query fingerprint data from data associated with the user uploaded audio or visual content;

ii. determining candidate reference content, from the data representing the universe of reference content, that is a possible match of the user uploaded audio or visual content, in which the possible match comprises a non-identical match between the candidate reference content and the user uploaded audio or visual content, said determining being based on the query fingerprint data;

iii. providing a computer controlled interface associated with the online content distribution site through which a queue is obtained, the queue for review by a first party, the queue providing access to the candidate reference content and the user uploaded audio or visual content;

iv. soliciting through the computer controlled interface an indication from the first party, the indication confirming whether the uploaded audio or audio content corresponds to the candidate reference content;

v. in response to the soliciting, obtaining the indication through the computer controlled interface;

vi. controlling distribution of the user uploaded audio or visual content from the online content distribution site to the public based on the indication, in which the user uploaded audio or visual content remains publically accessible on the online content distribution site pending receipt of the indication; and vii. in response to the indication, updating the data representing the universe of reference content with the query fingerprint data to more quickly enable future recognition of the user uploaded audio or visual content without review by the first party.

2. The system of claim 1 in which the query fingerprint data comprises a hash, and in which the non-identical match for the candidate reference content comprises a non-identical match based on the query fingerprint data hash with a hash corresponding to the candidate reference content.

3. The system of claim 1 in which said generating query fingerprint data comprises analyzing a transformed representation of the user uploaded audio or visual content, and in which said generating query fingerprint data utilizes hashing.

4. The system of claim 1 in which the queue comprises a link to the candidate reference content.

5. The system of claim 1 in which said determining candidate reference content utilizes a hamming distance.

6. The system of claim 1 in which the query fingerprint data comprises first plural hashes, and fingerprint data associated with the candidate reference content comprises second plural hashes, in which the possible match is determined by a distance function comparing the first plural hashes with the second plural hashes.

7. The system of claim 1 in which said one or more memory modules comprise one or more hard disks.

8. A method comprising:
   obtaining uploaded visual or audio content, the uploaded visual or audio content having been uploaded to an online service for distribution from the online service to the public;
   deriving query fingerprint data from the uploaded visual or audio content, said deriving query fingerprint data being performed by a configured computer system;
   determining candidate reference content, from a universe of reference content, that is a possible match of the uploaded visual or audio content, in which the possible match comprises a non-identical match between the candidate reference content and the uploaded visual or audio content, said determining being based on the query fingerprint data and being performed by a configured computer system;
   receiving an indication from a first party through an interface associated with the online service, the indication confirming that the uploaded visual or audio content corresponds to the candidate reference content;
   controlling distribution of the user uploaded visual or audio content from the online service to the public based on the indication; and
   based on the indication, updating the universe of reference content with the uploaded visual and audio content via the query fingerprint data to more quickly enable future recognition of the uploaded visual and audio content without review by the first party.

9. The method of claim 8 in which the query fingerprint data comprises a hash, and in which the non-identical match for the candidate reference content comprises a non-identical match between the query fingerprint data hash and a hash corresponding to the candidate reference content.

10. The method of claim 8 in which said deriving query fingerprint data comprises analyzing a transformed representation of the user uploaded visual or audio content, and in which said deriving query fingerprint data utilizes hashing.

11. The method of claim 8 further comprising queuing for review, the user uploaded visual or audio content item and data associated with the candidate reference content for review by the first party.

12. The method of claim 11 in which said queuing comprises providing a link to the candidate reference content.

13. The method of claim 8 in which the user uploaded visual or audio content is available for distribution to the public from the first party's online service pending receipt of the indication.

14. The method of claim 8 in which said determining candidate reference content utilizes a hamming distance.

15. The method of claim 8 in which the query fingerprint data comprises first plural hashes, and fingerprint data associated with the candidate reference content comprises second plural hashes, in which the possible match is determined by a distance function comparing the first plural hashes with the second plural hashes.

16. A non-transitory computer readable medium on which is stored instructions, which when executed by one or more processors, perform a method of:
   obtaining uploaded visual or audio content, the uploaded visual or audio content having been uploaded to an online service for distribution from the online service to the public;
   deriving query fingerprint data from the uploaded visual or audio content;
   determining candidate reference content, from a universe of reference content, that is a possible match of the uploaded visual or audio content, in which the possible match comprises a non-identical match between the candidate reference content and the uploaded visual or audio content, said determining being based on the query fingerprint data;
   handling an indication from a first party through an interface associated with the online service, the indication confirming that the uploaded visual or audio content corresponds to the candidate reference content;
   controlling distribution of the user uploaded visual or audio content from the online service to the public based on the indication; and
   based on the indication, updating the universe of reference content with the uploaded visual and audio content via the query fingerprint data to more quickly enable future recognition of the uploaded visual and audio content without review by the first party.

17. The non-transitory computer readable medium of claim 16 in which the query fingerprint data comprises a hash, and in which the non-identical match for the candidate reference content comprises a non-identical match between the query fingerprint data hash and a hash corresponding to the candidate reference content.

18. The non-transitory computer readable medium of claim 16 in which the deriving query fingerprint data comprises analyzing a transformed representation of the user uploaded visual or audio content, and in which said deriving query fingerprint data utilizes hashing.

19. The non-transitory computer readable medium of claim 16 further comprising queuing for review, the user uploaded visual or audio content item and data associated with the candidate reference content for review by the first party.

20. The non-transitory computer readable medium of claim 19 in which the queuing comprises providing a link to the candidate reference content.

21. The non-transitory computer readable medium of claim 16 in which the user uploaded visual or audio content is available for distribution to the public from the first party's online service pending receipt of the indication.

22. The non-transitory computer readable medium of claim 16 in which the determining candidate reference content utilizes a hamming distance.

23. The non-transitory computer readable medium of claim 16 in which the query fingerprint data comprises first plural hashes, and fingerprint data associated with the candidate reference content comprises second plural hashes, in which the possible match is determined by a distance function comparing the first plural hashes with the second plural hashes.

* * * * *